May 18, 1943. H. J. MAIHACK 2,319,423
FOOD WARMER
Filed Aug. 3, 1940
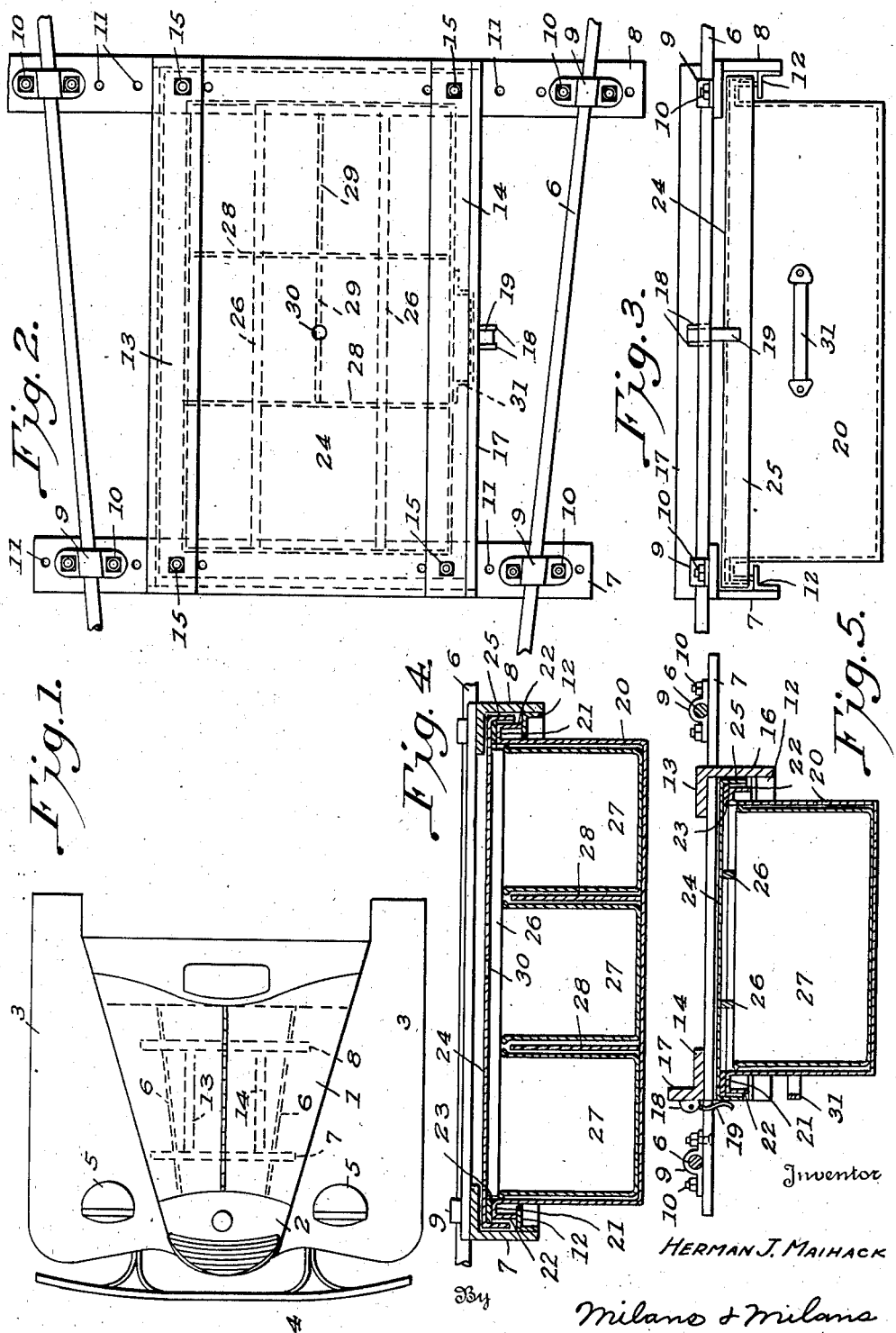
Inventor
HERMAN J. MAIHACK
By Milano & Milano
Attorneys Patented May 18, 1943

2,319,423

UNITED STATES PATENT OFFICE 2,319,423

FOOD WARMER

Herman J. Maihack, Jersey City, N. J., assignor of one-half to George H. Hutaff, Jr., Wilmington, N. C.

Application August 3, 1940, Serial No. 350,919

1 Claim. (Cl. 224—29)

My invention relates to new and useful improvements in food warmers or ovens and more particularly to a device of this character adapted to be supported under the hood of an automobile, the heat from the automobile engine being used to keep the food carried by the warmer or oven warm.

The principal object of the invention resides in the provision of a food warmer or oven which may be supported from the radiator stay rods positioned beneath the automobile hood and extending longitudinally thereof, the warmer or oven including a supporting frame structure adapted to be suspended from the radiator stay rods and a slidable drawer carried by the supporting structure, the drawer receiving a plurality of individual readily removable containers and having a cover enclosing the individual containers within the drawer, the cover being formed with a vent opening to permit the escape of steam.

Another object of the invention consists in the provision of a device of the character described in which certain of the parts are adjustable to permit use with supporting stay rods which may be positioned different distances apart transversely.

A still further object of the invention resides in the provision of a supporting frame structure and a slidable drawer carried thereby, means being carried by the supporting structure, and engageable with the slidable drawer, to hold the drawer in its normal position beneath the automobile hood but operable to release the drawer and permit the same to be slid relative to the frame structure to a position outside of the automobile hood and when in such position permitting ready access to the containers within the drawer which carry the foods.

With the above and other objects in view, as will appear as the description proceeds, my invention consists in the novel details of construction, and arrangement of parts, described in the following specification and illustrated in the accompanying drawing, and while I have illustrated and described the preferred embodiments of the invention, as they now appear to me, it will be understood that such changes may be made as will fall within the scope of the appended claim.

In the drawing:

Fig. 1 indicates a top plan of the automobile hood with my improved form of warmer or oven in dotted lines therebeneath.

Fig. 2 is a top plan of my improved form of warmer or oven and portions of the supporting radiator stay rods.

Fig. 3 is a side elevation of my improved form of food warmer or oven and fragments of the supporting radiator stay rods.

Fig. 4 is a longitudinal vertical section through my improved form of food warmer or oven with parts shown in elevation; and Fig. 5 is a transverse vertical section through my improved form of food warmer or oven with parts shown in elevation.

When going on a picnic or excursion it is often desired to carry along food for lunches or other meals and it is further desired to keep the food warm until consumed. It is for this purpose that my improved form of warmer or oven is provided. The food may be cooked at home and then placed in the individual containers carried by the slidable drawer, the drawer as a unit, with its cover, being positioned on the supporting structure carried by the automobile radiator stay rods and above the automobile engine, the heat from the engine being used for keeping the food warm. The oven or warmer is of such a construction that it is normally housed entirely under the automobile hood, out of view, but when it is desired to use the food one side of the hood may be raised in the usual manner and the drawer slid from its supporting structure towards the side of the automobile hood in a position so that ready access may be had to the containers carried by the drawer.

In the drawing 1 indicates generally the automobile hood, 2 the radiator, 3 the front fenders, 4 the front bumper and 5 the front headlights. Of course, these parts just referred to form no part of the present invention and are shown in Fig. 1 of the drawing to bring out the position in which my improved form of warmer or oven will be supported. The usual radiator stay rods are shown at 6 and extend longitudinally beneath the hood 1.

My improved form of oven or warmer includes the angle bars 7 and 8 adapted to extend transversely beneath the automobile hood and are supported from the stay rods 6 by the clamping plates 9 secured to the angle bars by means of the nuts and bolts 10 or other suitable fastenings. As shown each of the angle bars 7 and 8 is provided with the longitudinally spaced openings 11, in the horizontal angles thereof, these openings 11 permitting adjustment of the clamping plates 9 to adapt my device to be supported from stay rods positioned different distances apart, it being understood that the bolts of the fastenings 10 will be placed in the desired openings 11. Secured to the inner faces of the vertical angles of the bars 7 and 8, are the angle irons 12, the horizontal portions of which form a supporting rail or track for the slidable drawer to be later described. As shown the horizontal portions or angles of the irons 12 are spaced beneath and extend parallel with the horizontal angles of the bars 7 and 8. This is more clearly shown in Figs. 3 and 4 of the drawing.

The bars 7 and 8 are connected by the longitudinally extending bars 13 and 14 and are secured to the bars 7 and 8 by the bolts and nuts 15, the bolts being passed through the desired openings 11 in the bars. As quite clearly illustrated in Fig. 2 of the drawing the ends of the bars 13 and 14 overlie the upper surfaces of the bars 7 and 8. The vertical angle of the bar 13 extends downwardly as shown at 16, more clearly in Fig. 5 of the drawing, and the ends of this vertical angle terminate short of the ends of the bar 13 so that the angle may depend between the inner edges of the bars 7 and 8. This depending angle of the bar 13 forms a contact for the slidable drawer, to be later described, to limit the sliding movement of the drawer inwardly of the supporting structure, as shown clearly in Fig. 5. The vertical angle of the bar 14 extends upwardly, as shown at 17, to permit the drawer to be slid from the supporting structure. Formed on or secured to the front face of this vertical angle 17 are the forwardly extending ears 18 between which is mounted the spring latch 19 which depends to engage the drawer, to be later described, and to hold the same inwardly in its inwardmost position relative to the supporting frame structure. It will be seen that by the provision of the longitudinally spaced openings 11, in the bars 7 and 8, the positions of the longitudinally extending bars 13 and 14 may be adjusted by positioning the bolts of the bolt and nut fastenings 15 in the different openings.

The drawer, forming a part of my warmer or oven, is shown at 20 and along its upper edge is formed with the horizontal flange 21, the end of which is bent downwardly to form a vertical extension 22 which will engage the horizontal angles of the irons 12, as shown more clearly in Figs. 3 and 4 of the drawing. The inner edges of the horizontal portions, of the angles 12, will be positioned in close relation with the outer walls of the drawer to prevent play of the drawer between the irons. Positioned on the outwardly directed flange portion 21, of the drawer, is a gasket or packing 23 and at 24 I have shown a cover having the depending flange 25 and the longitudinally extending ribs 26 depending from the inner face thereof and adapted to engage the upper edges of the individual readily removable food containers 27, as shown more particularly in Figs. 4 and 5 of the drawing, to hold these containers downwardly in tight engagement with the bottom of the drawer. Transversely and longitudinally of the drawer I provide the partitions 28 and 29 extending upwardly from the bottom of the drawer and positioned between the individual food containers 27. By reference more particularly to Fig. 2 of the drawing it will be noted that one of the end containers is of greater length than the other containers and that the upwardly extending partition 29, which extends longitudinally of the drawer, does not extend the full length thereof. The cover 24 is provided with the vent opening 30, permitting the escape of any steam which may be generated within the drawer. As shown a handle 31 is secured to what might be termed the forward edge of the drawer to be grasped in sliding the drawer relative to the supporting structure.

From the above detailed description of the construction it is thought that the manner of use will be readily understood. As stated the supporting structure, forming a part of my oven or warmer, is suspended from the usual radiator stay rods 6 and the drawer 20 is slidable relative to the supporting structure on the horizontal angles of the irons 12. The food may be cooked and placed in the individual containers 27 which in turn are positioned in the drawer 20. Next the cover 24 is placed on the drawer and the depending ribs 26 will engage the upper edges of the containers to hold them tightly against the bottom of the drawer, it being understood that the cover 24 will be held in proper position by the horizontal portions or angles of the bars 7 and 8. The partitions 28 and 29 of the drawer form separate compartments for receiving the containers and, as previously set forth, any steam generated within the drawer may escape through the vent opening 30 in the cover 24. With the containers placed in the drawer the drawer will be slid on the supporting structure to its innermost position and the inner movement of the drawer will be limited by the depending angle 16 of the bar 13. The latch 19 will engage the forward edge of the cover, as shown more clearly in Figs. 3 and 5 of the drawing, to maintain the drawer in its proper innermost position relative to the supporting structure. Heat from the automobile engine confined beneath the hood will keep the food warm until it is desired to consume the same. When it is desired to consume the food the side of the hood 1 will be raised in the usual manner and by releasing the latch or catch 19, and engagement of the handle 31, the door 20 may be slid outwardly from the side of the hood to a position where the cover 24 may be removed to give access to the containers 27. The individual containers may be removed for the removal of the food. It will be noted that I have provided a food warmer or oven of such a construction that it may be supported beneath the hood of the automobile without making any alterations or changes in the automobile structure.

Having fully described my invention what I claim as new and desire to secure by Letters Patent is:

A container adapted to be carried by converging radiator stay rods beneath the hood of an automobile, the hood having movable side portions, including a supporting structure having transversely extending spaced bars provided with spaced openings therein, means including members insertable through the spaced openings of the bars for connecting the same to the stay rods and adapting the bars to be adjusted longitudinally of the converging stay rods, longitudinally extending bars connecting the transversely extending bars, means including members engageable with the longitudinally extending bars and insertable through the spaced openings in the transversely extending bars for permitting adjustment of the longitudinally extending bars on the transversely extending bars, track members carried by the transversely extending bars, and a slidable drawer supported by the track members, access being had to the slidable drawer by raising one of the movable side portions of the hood.

HERMAN J. MAIHACK.